E. SCHULTZ.
FRUIT PICKER.
APPLICATION FILED MAR. 25, 1909.
945,290.
Patented Jan. 4, 1910.
2 SHEETS—SHEET 1.
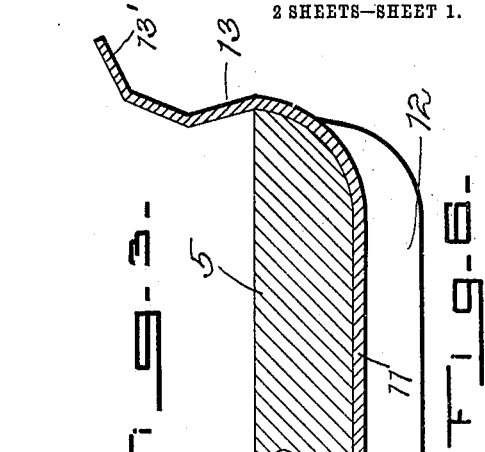
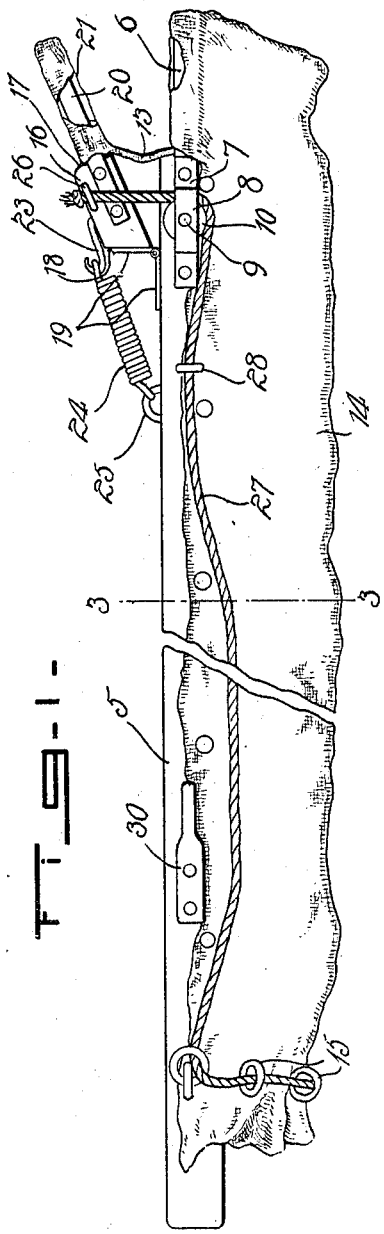
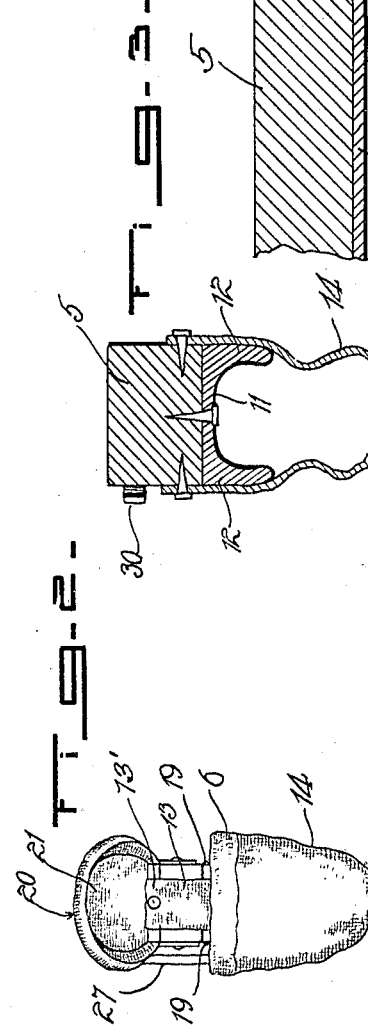
Inventor
ELMER SCHULTZ.
By Woodward & Chandlee
Attorneys.
Witnesses
C. E. Chandlee.
E. L. Chandlee

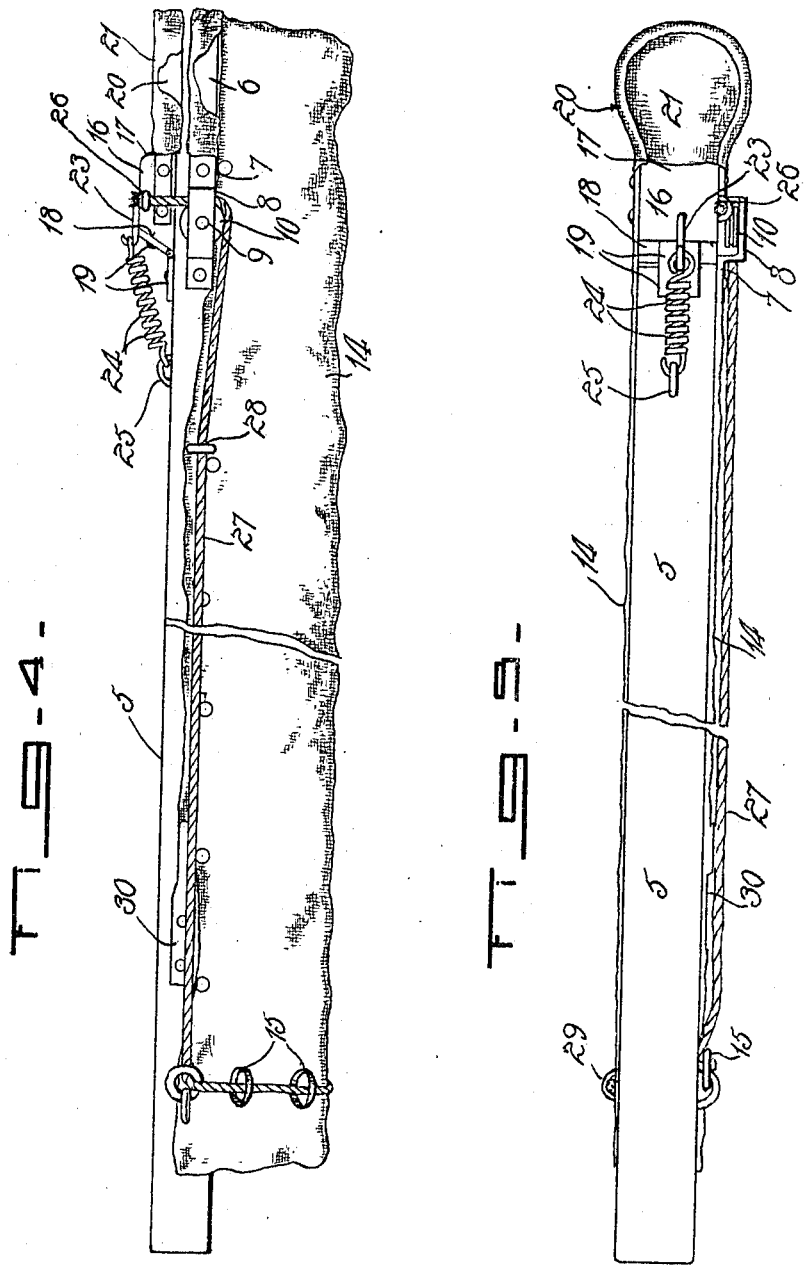

UNITED STATES PATENT OFFICE.

ELMER SCHULTZ, OF RHINEBECK, NEW YORK.

FRUIT-PICKER.

945,290.  Specification of Letters Patent.  Patented Jan. 4, 1910.

Application filed March 25, 1909. Serial No. 485,779.

*To all whom it may concern:*

Be it known that I, ELMER SCHULTZ, a citizen of the United States, residing at Rhinebeck, in the county of Dutchess and State of New York, have invented certain new and useful Improvements in Fruit-Pickers, of which the following is a specification.

This invention relates to an improvement in fruit pickers.

The object of my invention is to provide a fruit picker of that class used to pick the fruit singly, to prevent any bruising, scarring or marring of the same.

With these and other objects in view, the present invention consists in a combination and arrangement of parts as will be hereinafter more fully described and particularly pointed out in the appended claim, it being understood that changes in the specific structure shown and described may be made within the scope of the claim, without departing from the spirit of the invention.

In the drawings forming a part of this specification, and in which like numerals of reference indicate similar parts in the several views, Figure 1 is a side elevational view of a fruit picker embodying my invention, with the mouth open. Fig. 2 is a front view thereof, Fig. 3 is a transverse sectional view on lines 3—3 of Fig. 1. Fig. 4 is a side view, with the mouth closed. Fig. 5 is a top view. Fig. 6 shows the connection between the pad 11 and its end 13.

In the storing and picking of fruit, it is quite essential that the fruit should not be bruised, as the bruised part of the fruit not only becomes discolored but is the first to rot. For this reason all first grade fruit is singly picked, and the aim of this invention is to provide a light, readily operated picker, by means of which the fruit may be expeditiously picked without marring or bruising the same.

In the accompanying drawings, 5 represents the staff of my fruit picker which is preferably rectangular in cross section and is of suitable length. At one end I provide this staff with the loop 6, having the securing ends 7, by means of which the loop is secured to the staff. One of the loop ends 7 has an offset portion 8 as disclosed in Fig. 5 through which a pin 9 extends which revolubly supports the sheave 10. One side of this staff 5 is provided with a grooved pad 11 the edges 12 of which project outward so as to form a channel as clearly disclosed in Fig. 3. This pad 11 is continued through the loop 6 in a flat portion 13 as disclosed. Secured along opposite edges to the staff 5 is a fabric strip 14 which is looped over the cushion or pad 11 to form with said pad a chute through which the picked fruit passes. At one end this fabric strip 14 is secured to to the loop 6 while the remaining end is provided with a plurality of gromets 15.

Near the loop end I provide the staff 5 with a block 16 which has one of its ends 17 rounded while the opposite end 18 is scarfed as shown at 18. Secured to this scarf or oblique end 18 is a hinge 19 the second member or leaf of which is secured to the staff 5. Secured to this block 16 is the loop 20 which loop is provided with the fabric shield 21. The end 13' of the pad 11 is secured to the rounded end of the block 16 as disclosed in Fig. 2. In their closed condition the loops 6 and 20 register.

Secured to the block 16 is a hook 23 from which extends a coil spring 24 secured to the eye 25 fixed to the staff 5. This spring 24 normally draws the block 16 and its connecting loop 20 in an outward direction, the pad end 13 serving as a stop in limiting the outward movement of the loop 20.

Extending from the eye 26, secured to the block 16 is an operating strand 27, which strand passes over the sheave 10, through the eye 28, and at the remaining end is carried through the gromets 15 and secured to the staff 5, by means of the eye 29. At a suitable point the staff 5 is provided with a cleat 30.

The operation of my device is very simple. The lower end of the chute is first closed by means of the strand 27 which is wound about the cleat 30. The selected fruit is then introduced between the two members 6 and 20, when the strand 27 is operated to close the shield 21. This closing of the members then insures the removal of the fruit from its stem. The fruit slides down the chute within which it is collected. Of course if desired the bottom of the chute may be left uncovered or open so that the fruit may be collected within a basket or other receptacle.

Having thus described my said invention, what I claim as new and desire to secure by United States Letters Patent is:

A fruit picker having in combination a rectangular staff, a loop at one end of said staff, a grooved pad extending along one side of said staff, a fabric strip secured to said staff and loosely held over said pad to form a chute said strip being secured to said loop, a block having one end rounded and the other scarfed, a hinge secured to said scarfed end and to said staff, a loop carried by said block registering in one position with the loop carried by said staff, the upper end of said pad being extended through said staff loop and being secured to said block, a fabric shield carried by said last mentioned loop, a spring secured to said staff and to said block, said pad end serving as a stop to said block, a sheave secured to said staff, and a strand secured to said staff, one end closing said chute formed by said strip, the other being secured to said block, and passing over said sheave.

In testimony whereof I affix my signature, in presence of two witnesses.

ELMER SCHULTZ.

Witnesses:
ELMER COON,
THADDEUS A. TRAVERS.